3,203,367 
HAY WAFERING APPARATUS HAVING AIR SEPARATOR
Benson J. Lamp, Birmingham, Mich., assignor to Massey-Ferguson Incorporated, Detroit, Mich., a corporation of Maryland
Filed May 20, 1963, Ser. No. 281,533
20 Claims. (Cl. 107—14)

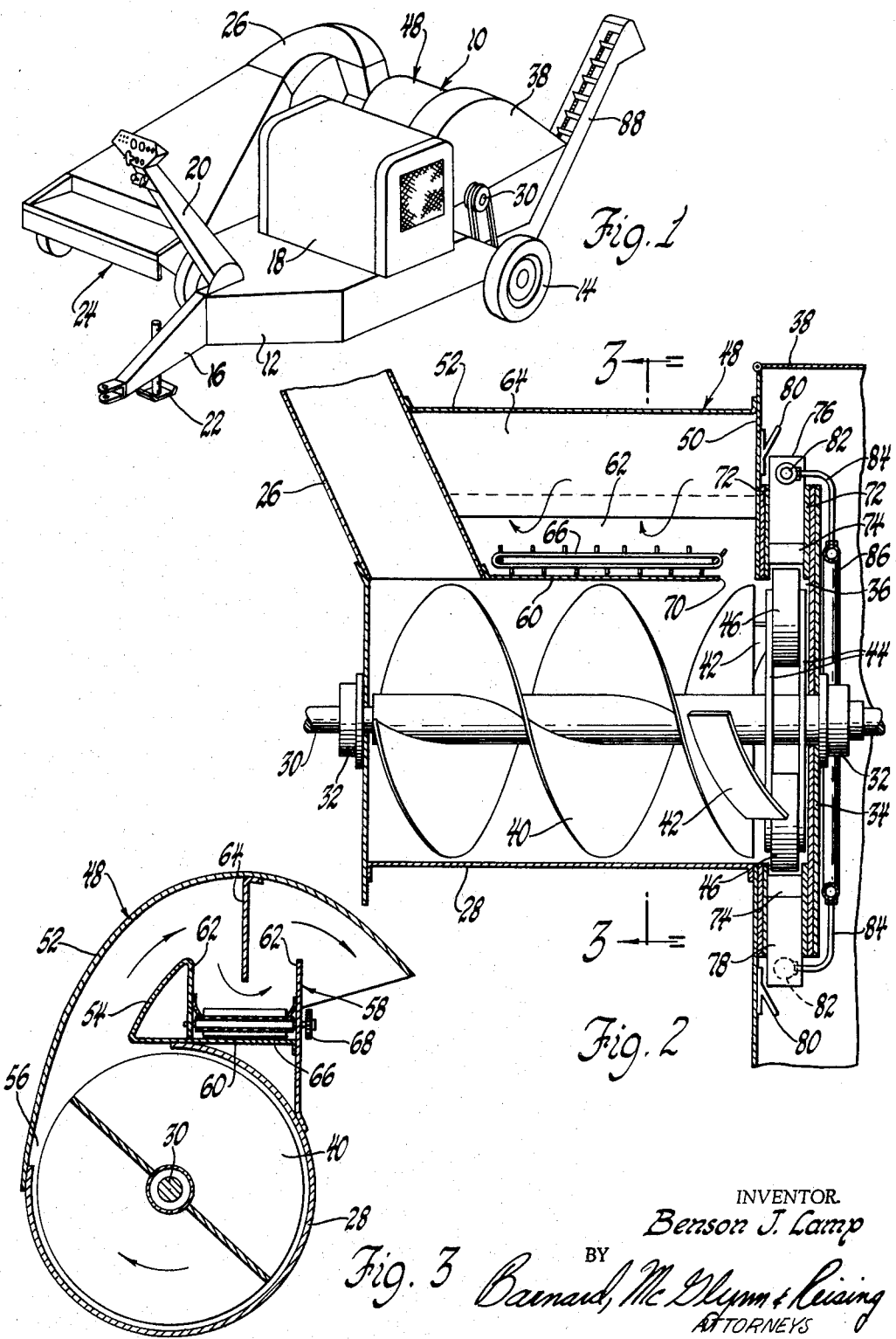

This invention relates to an apparatus for producing hay wafers and, in particular, to an apparatus for field wafering forage crops into hay wafers particularly characterized by an improved means for separating air from the hay being delivered to the wafering apparatus for wafering therein.

In recent times, apparatus has been devised for field wafering forage crops into hay wafers comprising an annular series of axially open die cells including entrance ends thereof circumferentially spaced about and communicating with a wafering chamber in which there is mounted a rotary hay compaction or compression means for compacting or compressing hay received within the wafering chamber into and through the die cells to form hay wafers. A rotatable multiple flight feed auger has been disposed within an enclosing hopper having one end thereof communicating with the aforementioned chamber. A pick-up mechanism, such as of the rotary flail type including a plurality of spaced rapidly rotatable flails or arms, has also been provided for picking up and delivering hay, preferably preconditioned or processed, finely chopped, mixed and blended hay from a windrow within a field, to the aforementioned hopper for feed therefrom to the wafering chamber. As a result, as such an apparatus moves through a field of mown hay, the latter is continuously picked up and delivered to the aforementioned hopper from which it is fed by the multiple flight feed auger to the wafering chamber and the rotary hay compaction or compression means aforementioned to provide a continuous extrusion of compressed or compacted hay of substantially uniform quality, constituency, shape and density emerging from the exit ends of the respective die cells, and each extrusion is adapted to be engaged with an ejection means adjacent the exit end of each of the die cells to break the respective extrusions of hay into hay wafers of substantially uniform length, which then preferably fall upon a conveyor means for removal from the apparatus.

In an apparatus of the type aforementioned, the hay mixture picked up and delivered by the aforementioned pick-up mechanism is entrained in or accompanied by an air stream traveling at considerable velocity due to the action of the rapidly rotating flails or arms of the pick-up mechanism. It has been found that, if this air stream or at least a substantial portion thereof is not separated from the hay being delivered to the hopper, a back pressure will build up in the latter retarding to a substantial extent further continuous supply of hay thereto by the rotary flail pick-up mechanism or the like. As a consequence, relatively elaborate arrangements have been made heretofore to separate the air stream, or at least a substantial portion thereof, from the hay prior to its delivery to the hopper.

For example, means have been provided in association with the delivery chute of the rotary flail type of pick-up mechanism for separating the air stream from the hay propelled through the delivery chute, and diverting or venting the air stream from the delivery chute. In such a diversion or venting arrangement, unfortunately, a portion of the hay or particles thereof remains entrained within the air being diverted or vented resulting literally in a dense cloud, relatively speaking, of air and entrained hay emerging from the apparatus. In other instances, often in combination with a venting or diversion arrangement aforementioned, various vent openings have been provided in other portions of the apparatus and even in a side wall of the hopper alongside the feed auger therein which, of course, is not too satisfactory since additional hay may be lost therethrough either while delivering hay to the hopper or during the feeding action therefrom under the influence of the feed auger, or both.

In view of the foregoing considerations, the present invention contemplates an improved apparatus for making compressed hay wafers and of the general type aforementioned having an annular series of axially open die cells including entrance ends thereof circumferentially spaced about and communicating with a wafering chamber in which there is mounted a rotary hay compaction or compression means for compacting or compressing hay received within the wafering chamber into and through the respective die cells to form wafers, a feed hopper having one end thereof communicating with the aforementioned chamber, rotatable multiple flight feed auger means mounted within the hopper for feed of hay therefrom to the aforementioned wafering chamber, and suitable pick-up means for delivering hay to be wafered in an accompanying air stream into the other end of the hopper for feed therealong under the influence of the feed auger through the aforementioned one end of the hopper to the wafering chamber, and is particularly characterized by a vent duct communicating with the interior of the hopper to vent at least a portion of the aforementioned air stream therefrom, such duct including means for separating and collecting hay entrained within such air stream being vented for return to the feed hopper.

The invention is particularly characterized by the fact that the aforementioned duct is shaped and positioned relative to the feed hopper and the rotatable auger means therein so as to receive the portion of the air stream propelled thereunto by centrifugal force applied by the auger means, the aforementioned separating and collecting means being located within the flow path through the duct and including a collection trough and cooperating baffling means to provide a tortuous flow path through a portion of the duct, whereby hay or hay particles entrained in the air stream being vented may be separated from such air stream and collected within such trough for return to the feed hopper.

More specifically in this regard, the aforementioned collection trough comprises a floor member and spaced upstanding side wall members, and the baffling means projects into the trough between such side wall members and terminates in spaced relation to the floor member to form the aforementioned tortuous flow path through the duct, whereby the air stream being vented through the duct impinges upon the baffling means and flows thereby through the trough and the side walls thereof to separate entrained hay and collect such hay within the trough.

In addition, the invention is further particularly characterized by means such as a powered conveyor extending along the aforementioned floor member of the trough between the side walls thereof to receive hay being separated from the vented air stream, suitable means being provided whereby the conveyor can continuously discharge hay collecting thereon back to the feeder hopper for feed to the wafering chamber.

In order to facilitate an understanding of the invention, a preferred embodiment thereof will now be described with reference to the accompanying drawing in which:

FIGURE 1 is a perspective view of a hay wafering apparatus illustrating a preferred embodiment of the invention;

FIGURE 2 is an enlarged fragmentary longitudinal sectional view through the feed hopper means, wafering chamber and associated elements thereof of the apparatus of FIGURE 1 illustrating certain details thereof; and FIGURE 3 is a sectional view taken on line 3—3 of FIGURE 2.

Referring now to the drawing, the numeral 10 in FIGURE 1 generally indicates a hay wafering apparatus comprising a frame 12 equipped with the ground-engaging wheel means 14 in the usual manner and a drawbar 16 adapted to be hitched to a suitable prime mover, such as an agricultural tractor, for drawing the frame along a field of mown hay. A suitable engine 18 is mounted on the frame and is connected in a conventional manner as to be described hereinafter to a rotary hay feeding and compaction or compression mechanism of the apparatus, as well as various other instrumentalities of the apparatus as desired. A control pedestal 20 is provided on the frame and mounts at the upper end thereof a control panel having instruments thereon for controlling the engine 18 and other instrumentalities of the apparatus. An adjustable foot 22 is provided as usual on the drawbar 16 to support the latter when the apparatus is not hitched to a towing prime mover.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogenous mass. As the apparatus is towed along the field, the hay in a given windrow is adapted to be picked up in a suitable pick-up mechanism such as of the well known rotary flail type indicated generally at 24 and comprising a plurality of rapidly rotatable flails or arms which pick up and direct the homogenized hay in an accompanying air stream into the delivery chute 26, which delivers the hay and accompanying air stream at a relatively great velocity into the side wall of a generally cylindrical horizontally disposed hopper 28 adjacent one end thereof as illustrated in FIGURE 2.

It will be appreciated that the output shaft of the engine 18 may be drivingly coupled by the usual belt means and a large pulley or fly wheel of conventional construction, and hence not shown, to one end of a horizontally disposed rotatable drive shaft 30 extending through the hopper 28. More specifically in this regard, such a known pulley or fly wheel would be fixed to the leftward end of the drive shaft as viewed in FIGURE 2 axially beyond the hopper. Furthermore, by additional belt and pulley means of conventional construction, and hence also not shown, engine power may be transmitted to the rotary flail pick-up mechanism 24 to operate the latter, all of which will be readily apparent to those acquainted with this art.

The drive shaft 30 is suitably rotatably supported in bearing means 32 carried by a closed end wall 34 of the feed hopper 28 and bearing means 32 carried by a wall member 34 fixed axially opposite from the other open end of the hopper. As appears particularly in FIGURE 2, the drive shaft extends horizontally through the hopper, through an annular vertically disposed wafering chamber 36 disposed between wall member 34 and the adjacent open end of the hopper with which it communicates, and beyond the chamber through an enlarged housing member 38 extending generally about the wafering chamber. A double flight feed auger 40 is secured on the drive shaft 30 within the hopper 28 so as to extend between the ends of the latter, and is radially inwardly spaced slightly from the cylindrical side wall thereof, while a pair of arcuate deflector vanes 42 project from one end of each auger flight into the wafering chamber 36. A pair of axially spaced radially extending arms 44 have their central portions suitably rigidly secured to the drive shaft 30 for rotation therewith within the wafering chamber 36, and have the compaction or compression rollers 46 respectively journaled at the opposite ends thereof. The deflector vanes 42 are disposed in advance of the path of rotation of the arms 44 and the respective rollers 46 within the wafering chamber for a purpose to appear hereinafter.

Duct means for venting at least a substantial portion of the accompanying air stream discharged to the hopper 28 by the delivery chute 26 is indicated generally at 48. Such duct means extends between a wall 50 of the aforementioned housing member 38 adjacent the open end of the hopper communicating with the wafering chamber 36 to the terminal portion of the delivery chute 26 and its connection to the remote end of the feed hopper 28 and, as indicated particularly in FIGURE 3, comprises an axially extending radially curved hood panel member 52 and cooperating inner panel member 54 communicating with an inlet opening 56 in the side wall of the hopper 28 extending along a substantial portion of the length of the latter between the open end of the hopper and the wafering chamber 36 towards the delivery chute 26. As clearly appears in FIGURE 3, the duct means extends generally over the top of the feed hopper 28.

With reference particularly to FIGURES 2 and 3, it will be noted that the duct means 48 includes means for separating entrained hay from air being vented and for collecting and returning such hay to the feed hopper 28. More specifically, the duct means further includes a collection trough indicated generally at 58 extending along the upper side wall of the hopper and comprising a floor member 60 and the spaced upstanding side wall members 62 projecting into the flow path through the duct means. A baffle plate 64 projects from the hood panel member 52 into the aforedescribed trough between the side wall members 62 and terminates in spaced relation to the floor member 60. As will be particularly apparent from FIGURE 3, the relative positions of the baffle member 64 and the side wall members 62 of the collection trough provide a tortuous flow path through that portion of the duct means where such construction is located.

A conveyor mechanism 66 extends along the floor member 60 and may be suitably powered from the engine 18 by means of a drive connection to a pulley or gear member 68 associated with one support shaft for the conveyor. It will be noted from FIGURE 2 that one end of the floor member 60 and the side wall of the hopper 28 include means forming a supply opening 70 communicating with the interior of the hopper adjacent the open end thereof communicating with the wafering chamber 36, whereby hay collected on the conveyor may be continuously returned to the feed hopper adjacent such open end thereof.

Thus, as the apparatus aforedescribed is towed along a field of mown hay and hay in accompanying air stream at relatively high velocity is supplied to the hopper 28, at least a substantial portion of the accompanying air stream is separated from the heavier hay particles and is thrown by centrifugal force imposed by the rapidly rotating feed auger 40 into the inlet 56 of the duct means 48, and flows therethrough to atmosphere to prevent any pressure build-up within the hopper which might otherwise retard continuous delivery of the hay thereto through the delivery chute 26. At the same time, of course, a substantial portion of the hay so-delivered will be fed axially along the feed auger 40 or to the right in FIGURE 2 and into the wafering chamber 36. Furthermore, portions of the hay or hay particles which may be entrained in the air stream being vented as aforedescribed is substantially prevented from escaping from the duct means into atmosphere due to impingement thereof on the baffle member 64, and the tortuous path of travel required of such air and entrained hay beneath such baffle member and over the side wall members 62 of the collection trough 58 adjacent the exit end of the duct means. As a consequence, a substantial portion of the entrained hay drops onto the conveyor 66 which is operated in a continuous fashion to dump or return such hay through supply opening 70 into the open end of the feed hopper 28 for feed to the wafering chamber 36. In this regard, the length of the hopper 28 and auger 40 is as great as possible to minimize air velocity at the open end of the hopper communicating with the wafering chamber.

The wafering chamber 36, the die cells associated therewith and through which the hay is adapted to be compacted or compressed by the rollers 46 to form extrusions of compacted hay emerging from the exit end thereof, and the means for breaking wafers from such extrusions and conveying them from the apparatus may be constructed in any one of various known ways, one of which is illustrated in the drawing. Since the details of such construction do not, in and of themselves, form a part of the present invention and are known, a brief description of the nature operation of these components of the apparatus should suffice for present purposes.

Thus, the wafering chamber 36 includes a pair of axially spaced vertically disposed parallel annular end die wall members 72 respectively suitably fixedly mounted as on the wall member 34 and the opposite wall 50 of the housing member 38, there being fixedly disposed between such annular die wall members an annular or circumferentially spaced series of knife edges 74. An annular or circumferentially spaced series of pairs of side die wall members 76 and 78 are disposed between the end die wall memers 72, and have their radially inner ends suitably hingedly connected adjacent a radially outward portion of each of the respective fixed knife edges 74 so as to diverge radially outwardly therefrom in a V-shaped configuration. Thus, a series of axially open radially extending die cells are formed between the end die wall members 72 and the respective oppositely spaced side die wall memebrs 76 and 78 of an adjacent pair thereof as will be readily apparent to those aquainted with this art, and the axes of such die cells are contained in a common vertical plane or plane vertical with the ground, with the entrance ends thereof communicating with wafering chamber 36. An annular series of ejector plates 80, one for each die cell, is suitably secured to the wall 50 of the housing member 38 and are shaped so as to extend obliquely to the axes of the die cells and over the exit ends thereof for engagement with extrusions of compacted hay emerging therefrom to break the extrusions into wafers.

The numeral 82 indicates conventional hydraulically operated motor assemblies of the type comprising relatively reciprocable piston and cylinder elements interposed between each hinged pair of side die wall members 74 and 76 to control their angular relationship relative to each other and, hence, the extent of convergence of the areas of the die cells between their entrance and exit ends, each of the motor assemblies being connected in the usual manner through individual conduits 84 to a common annular manifold 86 connected to a suitable source of fluid under pressure carried by and manually controlled from the frame 12.

As will be apparent, the rollers 46 are positioned closely to but do not engage the knife edges 74. Thus, hay fed continuously by the feed auger 40 from the hopper 28 into the wafering chamber 36 is laid by the deflector vanes 42 across the knife edges and upon the entrance ends of the respective die cells immediately in advance of the rotative path of the rollers, and the rollers compact or compress the hay and force it past the knife edges and into and through the respective die cells upon successive rotative passes thereof.

As the extrusions of hay emerge from the exits ends of the respective die cells, such extrusions engage the respective ejector plates 80 which cause them to bend and break substantially at the exit ends of the die cells to form wafers which drop within and toward the bottom of the housing member 38 and onto one end of an elevator type conveyor 88 of conventional construction equipped with spaced conveyor paddles which pick up the hay wafers and convey them from the apparatus, preferably into a trailing conveyance.

The embodiments of the invention in which an exclusive property or privilege is claimed are defined as follows:

1. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in an accompanying air stream into said hopper; the improvement comprising means exterior of and communicating with the interior of said hopper to vent at least a portion of said air stream therefrom, and means associated with said last-named means for separating hay entrained within said air stream being vented.

2. In an apparatus for making compressed hay wafers, and of the type including a plurality of die cells having entrance ends thereof communicating with hay compression means for compressing hay into and through said die cells to form wafers, a feed hopper communicating with said hay compression means, rotatable feed auger means mounted within said hopper to feed hay received within the latter to said hay compression means, and means for delivering hay to be wafered in an accompanying air stream into said hopper; the improvement comprising duct means communicating with the interior of said hopper to vent at least a portion of said air stream therefrom, and separating means associated with said duct means for separating hay entrained within said air stream being vented.

3. The apparatus according to claim 2 wherein said duct means comprises an inlet connected to a side wall of said hopper and an outlet communicating with atmosphere, said duct means extending centrifugally from said feed hopper and the axis of rotation of said feed auger means, whereby centrifugal force applied by said feed auger means propels said portion of said air stream into said duct means.

4. The apparatus according to claim 2 wherein said separating means is located within the flow path through said duct means and includes baffling means for separating hay entrained within said air stream being vented.

5. The apparatus according to claim 2 wherein said duct means comprises an inlet connected to a side wall of said hopper and an outlet communicating with atmosphere, said duct means extending centrifugally from said feed hopper and the axis of rotation of said feed auger means, whereby centrifugal force applied by said feed auger means propels said portion of said air stream into said duct means; and wherein said separating means is located within the flow path through said duct means between said inlet and outlet thereof and includes baffling means for separating hay entrained within said air stream being vented.

6. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in an accompanying air stream into said hopper; the improvement comprising means exterior of and communicating with the interior of said hopper to vent at least a portion of said air stream therefrom, and means associated with said last-named means for separating and collecting hay entrained within said air stream being vented.

7. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in an accompanying air stream into said hopper; the improvement comprising means exterior of and communicating with the interior of said hopper to vent at least a portion of said air stream therefrom, and means associated with said last-named means for collecting hay entrained within said air stream being vented.

8. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in an accompanying air stream into said hopper; the improvement comprising means exterior of and communicating with the interior of said hopper to vent at least a portion of said air stream therefrom, and means associated with said last-named means for separating and returning to said hopper hay entrained within said air stream being vented.

9. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in an accompanying air stream into said hopper; the improvement comprising duct means communicating with the interior of said hopper to vent at least a portion of said air stream therefrom, and separating means within said duct means for separating hay entrained within said air stream being vented therethrough.

10. The apparatus according to claim 9 wherein said separating means includes baffling means for separating hay entrained within said air stream being vented.

11. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in any accompanying air stream into said hopper; the improvement comprising duct means communicating with the interior of said hopper to vent at least a portion of said air stream therefrom, and separating and collecting means within said duct means for separating and collecting hay entrained within said air stream being vented therethrough.

12. The apparatus according to claim 11 wherein said separating and collecting means comprises a hay collection trough, and baffle means projecting into said trough to form therewith a tortuous flow path through said duct means, whereby hay entrained within and separated from the air stream being vented is collected within said trough.

13. The apparatus according to claim 12 further comprising return means for returning hay collected in said trough to said hopper.

14. The apparatus according to claim 12 wherein one end of said trough includes means defining a supply opening communicating with the interior of said hopper; and further comprising return means for returning hay collected in said trough through said supply opening to said hopper.

15. The apparatus according to claim 14 wherein said return means comprises conveyor means extending along said trough to continuously convey hay collecting therein to said supply opening.

16. The apparatus according to claim 11 wherein said separating and collecting means comprises a hay collection trough having a floor member and spaced wall members upstanding therefrom, and baffle means projecting into said trough between said side wall members and terminating in spaced relation to said floor member to form a tortuous flow path through said duct means, whereby hay entrained within and separated from the air stream being vented is collected within said trough.

17. The apparatus according to claim 16 wherein one end of said floor member includes means defining a supply opening communicating with the interior of said hopper; and further comprising return means for returning hay collected in said trough through said supply opening to said hopper.

18. The apparatus according to claim 17 wherein said return means comprises conveyor means extending along said floor member between said side wall members of said trough to continuously convey hay collecting therein to said supply opening.

19. In an apparatus for making compressed hay wafers, and of the type including a plurality of die cells having entrance ends thereof communicating with hay compression means for compressing hay into and through said die cells to form wafers, hay feeding means including a feed hopper communicating with said hay compression means for feeding hay thereto, and means for delivering hay to be wafered in an accompanying air stream into said hopper; the improvement comprising duct means communicating with the interior of said hopper to vent at least a portion of said air stream therefrom, separating means within said duct means for separating hay entrained within said air stream being vented therethrough, and return means for returning such separated hay to said hopper.

20. In an apparatus for making compressed hay wafers, and of the type including a plurality of die cells having entrance ends thereof communicating with hay compression means for compressing hay into and through said die cells to form wafers, hay feeding means including a feed hopper having one end thereof communicating with said hay compression means for feeding hay thereto, and means for delivering hay to be wafered in an accompanying air stream into said hopper; the improvement comprising duct means communicating with the interior of said hopper to vent at least a portion of said air stream therefrom, separating and collecting means within said duct means for separating and collecting hay entrained within said air stream being vented therethrough, and return means for returning such collected hay to said hopper.

References Cited by the Examiner

UNITED STATES PATENTS

| | | | |
|---|---|---|---|
| 657,998 | 9/00 | Williams | 209—143 |
| 1,238,981 | 9/17 | Barton. | |
| 2,078,565 | 4/37 | Durst et al. | |
| 2,777,403 | 1/57 | Mladek | 18—12 |
| 2,843,989 | 7/58 | McClellan | 56—24 X |

FOREIGN PATENTS 1,250,174 11/60 France.

OTHER REFERENCES

Livestock Journal, April 1961, pages 36 and 39.
Agricultural Engineering S.671.A3, August 1961, pages 412–415 and 423.

WALTER A. SCHEEL, *Primary Examiner.*